Oct. 13, 1970  G. MAGNIN  3,533,161
ELECTRIC JUMPING SAW FOR OPENING SURGICAL PLASTER DRESSINGS
Filed March 5, 1968
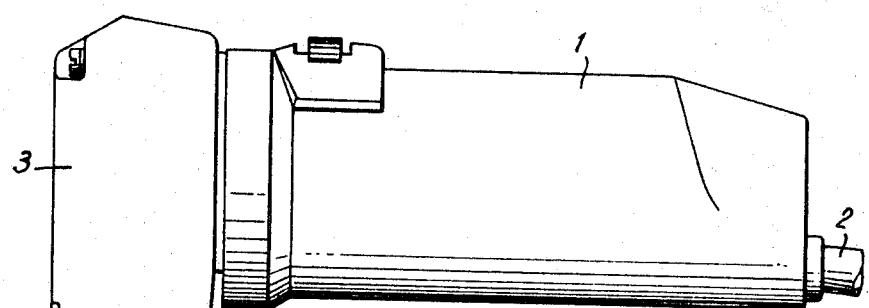
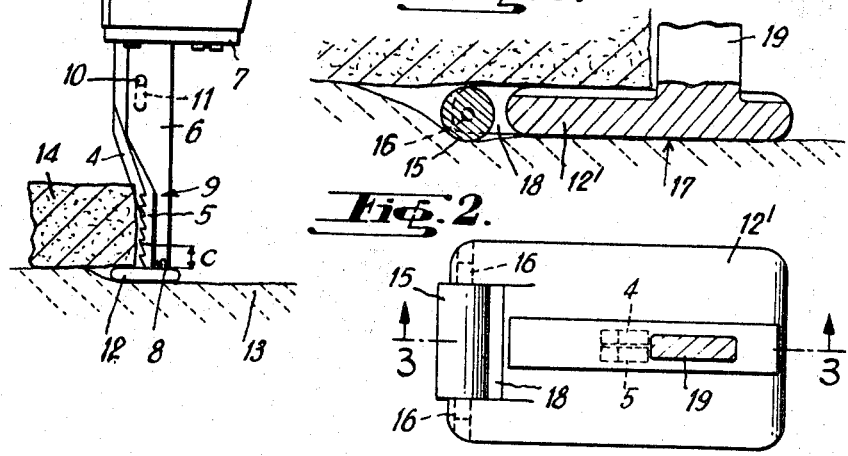
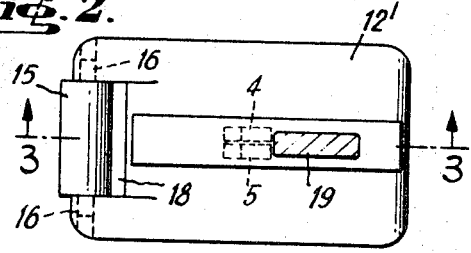
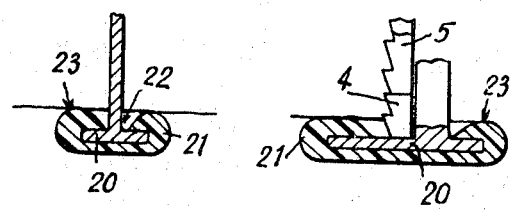 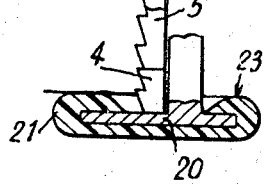 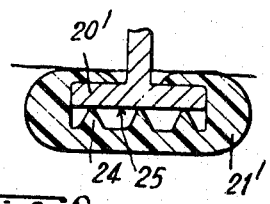
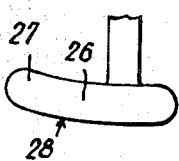 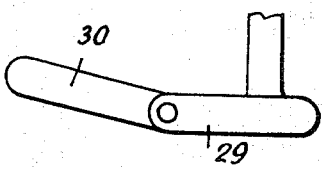
INVENTOR
GEORGES MAGNIN
By Stevens, Davis, Miller & Mosher
ATTORNEYS United States Patent Office 3,533,161
Patented Oct. 13, 1970

3,533,161
ELECTRIC JUMPING SAW FOR OPENING SURGICAL PLASTER DRESSINGS
Georges Magnin, 39 Rue Abraham Robert, 2300 La Chaux-de-Fonds, Switzerland
Filed Mar. 5, 1968, Ser. No. 710,608
Claims priority, application Switzerland, Mar. 29, 1967, 4,373/67
Int. Cl. B23d 45/00; B26b 7/00
U.S. Cl. 30—166                                              7 Claims

ABSTRACT OF THE DISCLOSURE

An electrical apparatus for cutting surgical plaster dressings comprising reciprocating cutting means, a guiding sheath for said cutting means, and a protecting and guiding shoe attached to an extension of said sheath. The shoe is adapted to rest against the portion of the body surrounded by the dressing while the dressing is being cut so as to protect the body from the blades. Means are provided around the shoe to inhibit heat transmission therefrom to the body.

---

The present invention concerns an electric jumping saw for opening surgical plaster dressings in which at least one saw blade is guided in a rigid sheath.

Various known methods are used to open a surgical plaster dressing, but all of them have the disadvantage of employing devices which come into contact with the skin and risk to wound the patient. In particular, oscillating circular saws are used, the blade of which may break the skin after having cut through the plaster dressing.

The arm of the present invention is to remedy these disadvantages and the electric jumping saw which it concerns is distinguished by the fact that the guiding sheath of the saw blade extends up to a point which corresponds at least approximately to the end of the outward stroke of the saw blade and by the fact that a protecting and guiding shoe is fixed to the end of the guiding sheath perpendicularly to the blade and in the axis of the latter, this shoe being destined to rest against the body surrounded by the plaster dressing to be opened and preventing the saw blade from coming into contact with the said body.

The appended drawing illustrates, by way of example, an embodiment of the object of the invention.

FIG. 1 is a view of an elevation of this embodiment.
FIG. 2 is an enlarged plane view of a variant of a detail of FIG. 1.
FIG. 3 is a cross-section along the line 3—3 of FIG. 2.
FIG. 4 is a cross-section of another variant of this detail.
FIG. 5 is a cross-section perpendicular to the cross-section of FIG. 4.
FIG. 6 is a section similar to that of FIG. 4 of another variant.
FIGS. 7 and 8 are views of elevations of two other variants of the same detail.

The illustrated jumping saw is destined to open surgical plaster dressings and comprises a casing 1 of a known type forming a handle and containing an electric motor (not shown) fed through a cable 2. This motor drives, in a known manner, a mechanism enclosed in a casing 3 and destined to transform the rotary motion of the motor into a reciprocating motion of the two saw blades 4 and 5.

A rigid sheath 6 intergral with a plate 7 screwed to the casing 3 serves to guide the saw blades 4 and 5. The sheath 6 extends up to a point 8 which corresponds approximately to the end of the outward stroke of each saw blade. This stroke is indicated in c in the drawing. The blade 4 is at the end of its outward stroke when the blade 5 is at the end of its inward stroke.

The cross-section of the upper part of the sheath is in the shape of a U whilst the lower part, i.e. from the point 9 downwards, has a rectangular cross-section the smaller side of which is slightly narrower than the thickness of the two saw blades placed in contact side by side. A pin 10 which can travel in an elongated hole 11 of the sheath 6 serves to guide the blade 5, a similar guide being provided on the other side for the blade 4.

A protecting and guiding shoe 12 is secured to the end 8 of the guiding sheath 6, perpendicularly to the blades 4 and 5 and in the median axis of the latter. The shoe 12 of ovoid shape is destined to reset against the body 13 surrounded by a plaster dressing 14 and to prevent the saw blades from coming into contact with the skin of the fractured limb when the plaster dressing 14 is being opened. FIG. 1 shows how the shoe 12 is engaged under the plaster dressing 14 whilst resting against the skin in which it forms a slight hollow which is sufficient to allow the saw blades to cut through the plaster dressing over its entire height.

In order to facilitate the sliding motion of the shoe 12 under the plaster dressing 14, a freely rotating roller 15 is mounted at the front end of the shoe, as shown in the variant of the FIGS. 3 and 4. In order to prevent the roller 15 from resting simultaneously against the skin and against the plaster dressing, the axis 16 of the roller is disposed closer to the sliding surface 17 of the shoe 12' so that the roller projects beyond this surface and only rests on the skin. An opening 18 is arranged at the rear of the roller 15 in order that the tearing out of eventual hairs dragged along by the roller may be avoided. The rectangular cross-section of the extension of the sheath 6 may be remarked in 19 in FIG. 2, the cross-section of the saw blades being shown in dotted lines in order to show that the thickness of the two blades exceeds that of the cross-section 19. It is obvious that idling rollers could be mounted in place of the roller 15.

In the variant according to FIG. 4 the shoe 20 is sheathed in plastic material 21 in order to insulate this metallic shoe thermicaly from the skin. The plastic material 21 forms a recess 22 opposite the end of the saw blades in order to allow the latter to cut through below the level of the surface 23 of the sheathed shoe which comes into contact with the plaster dressing. The cross-section of FIG. 5 shows the end of the saw blade 4 engaged in the recess 22.

In order to improve the cooling of the metallic shoe 20', ribs 24 are formed between the sole 25 and the plastic material 21', as illustrated in FIG. 6 at a larger scale.

In the variant of FIG. 7, the shoe 26 is provided with an arcuate front end indicated in 27, diverging from the sliding surface 28.

FIG. 8 illustrates a variant in which the shoe is in two parts 29 and 30 connected one to the other by a joint so that it may follow the deformations of the body on which it is moved, the part 30 naturally forming the front end of the shoe.

Although in the described example the jumping saw comprises two blades, it would also be possible to provide it with a single blade only.

The described jumping saw has the advantage of being of simple construction, rapid in operation, safe and without risk of wounding the part of the body surrounded by the plaster dressing to be opened. In addition it can be provided with a set of different shoes, easily interchangeable according to the work it has to effect. To this end it is only necessary to unscrew the plate integral with the sheath bearing the shoe in order to replace it by another, or again to change the plastic part surrounding the shoe, means being provided to secure this part in a removable manner on the shoe.

I claim:

1. Electric apparatus for cutting surgical plaster dressings surrounding a body, comprising: a casing including a handle for gripping the apparatus; an electric motor mounted in said casing; cutting means driven by said motor and extending outwardly of said casing, said cutting means being formed with two reciprocating saw blades placed in contact side by side, said blades being so actuated that one is at the end of its outward stroke when the other is at the end of its inward stroke; a guiding sheath in which said saw blades are mounted, said sheath extending up to a point which corresponds with the end of the outward stroke of the saw blades; a protecting and guiding shoe fixed to an extension of said guiding sheath in order to rest against the body surrounded by the plaster to be opened, said extension being narrower than the thickness of the two saw blades.

2. Electric apparatus for cutting surgical plaster dressings surrounding a body, comprising: a casing including a handle for gripping the apparatus; an electric motor mounted in said casing; cutting means driven by said motor and extending outwardly of said casing, said cutting means being formed with two reciprocating saw blades placed in contact side by side, said blades being so actuated that one is at the end of its outward stroke when the other is at the end of its inward stroke; a guiding sheath in which said saw blades are mounted, said sheath extending up to a point which corresponds with the end of the outward stroke of the saw blades; a protecting and guiding shoe fixed to an extension of said guiding sheath in order to rest against the body surrounded by the plaster to be opened, said extension being narrower than the thickness of the two saw blades; a plastic material thermically insulating the shoe from the skin with which it comes into contact; and means located between said shoe and said plastic material for limiting the transmission of heat from the shoe to said plastic material.

3. Saw according to claim 1, wherein the shoe is provided with a roller disposed closer to the sliding surface of the shoe so that the roller only rests on the skin.

4. Saw according to claim 2, wherein said shoe is made from metallic material.

5. The saw of claim 4 wherein said means comprises a means defining void space containing at least one rib in said plastic, adjacent to said shoe, said rib contacting said shoe.

6. Electric jumping saw for opening surgical plaster dressings, in which at least one saw blade is guided in a sheath, wherein said guiding sheath extends up to a point which corresponds at least approximately to the end of the outward stroke of the saw blade, and wherein a plastic-sheathed metallic protecting and guiding shoe is fixed to the end of the guiding sheath perpendicularly to the blade and in the axis of the latter, said shoe being adapted to rest against the body surrounded by the plaster dressing to be opened in order to prevent the saw blade from coming into contact with said body; and means located between said shoe and said plastic for limiting the transmission of heat from the former to the latter.

7. The saw of claim 6 wherein said means comprises a void space containing at least one rib in said plastic, adjacent to said shoe, said rib contacting said shoe.

References Cited

UNITED STATES PATENTS 2,492,156   12/1949   Kupjack _____ 30—166

FOREIGN PATENTS 518,545   2/1931   Germany.

JAMES L. JONES, Jr., Primary Examiner

U.S. Cl. X.R.

30—273